(No Model.) 3 Sheets—Sheet 1.
J. W. ATKINSON & C. E. WHITE.
COMBINED CORN AND COTTON PLANTER.
No. 350,964. Patented Oct. 19, 1886.
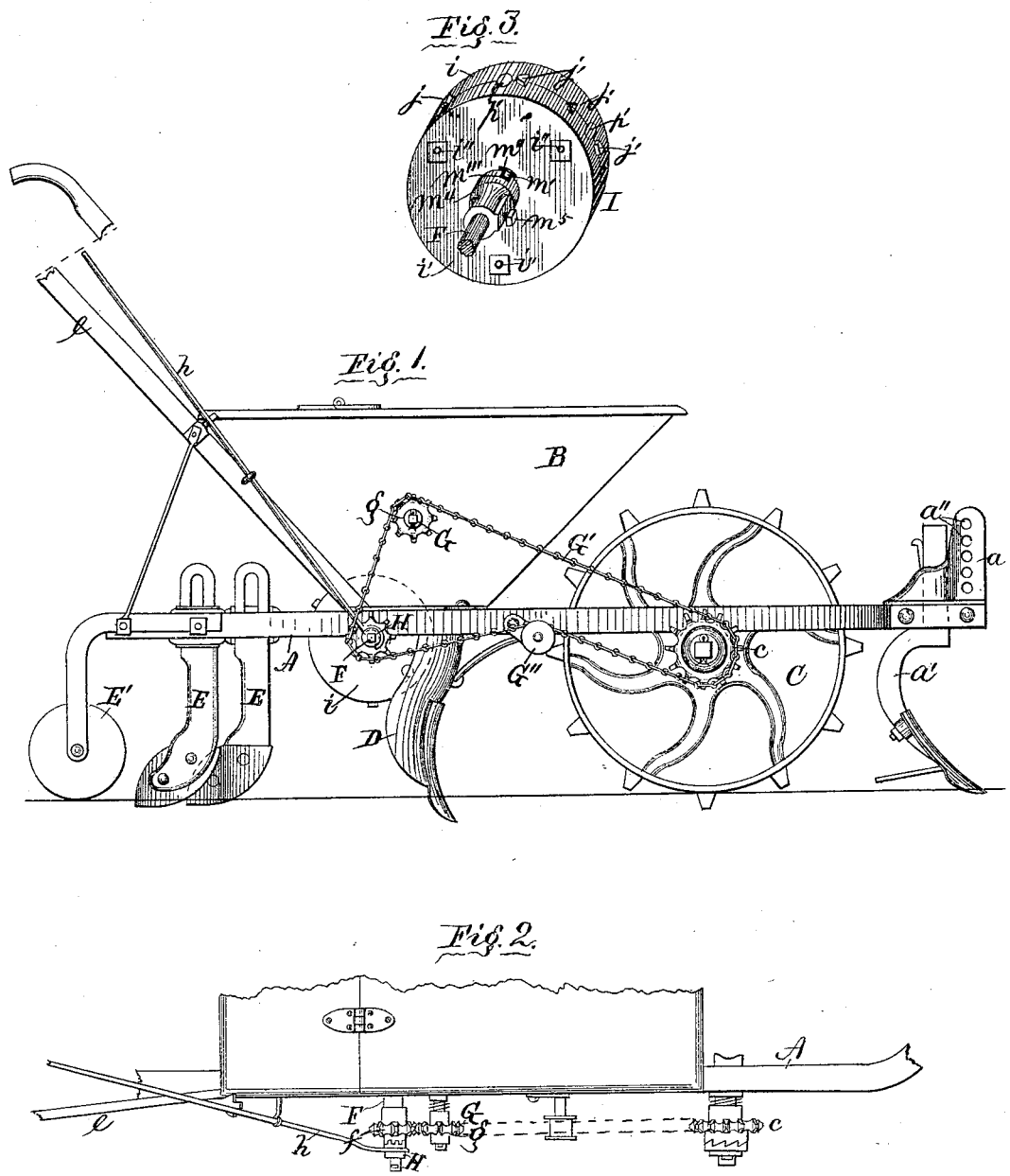

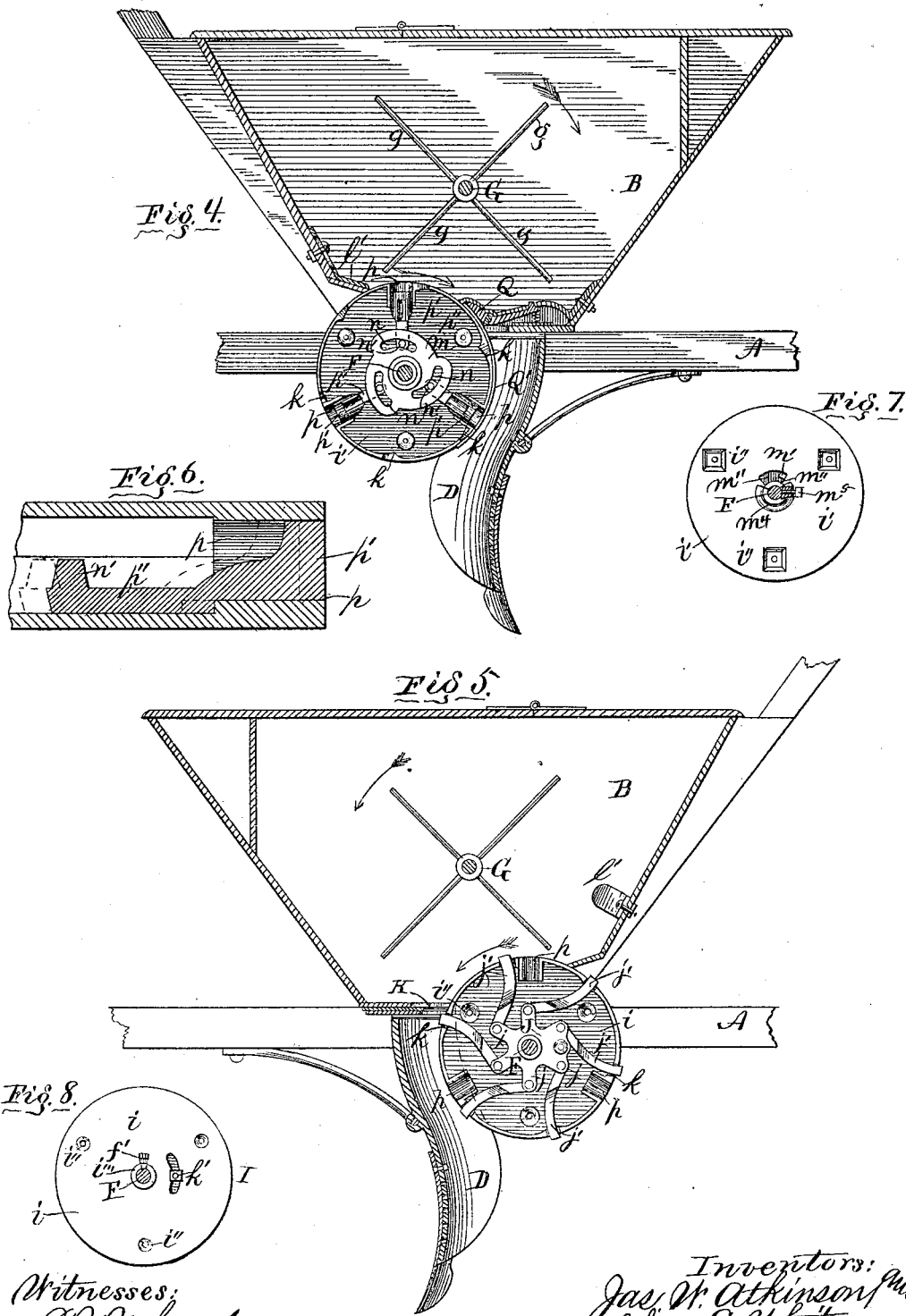

(No Model.) 3 Sheets—Sheet 3.
J. W. ATKINSON & C. E. WHITE.
COMBINED CORN AND COTTON PLANTER.
No. 350,964. Patented Oct. 19, 1886.
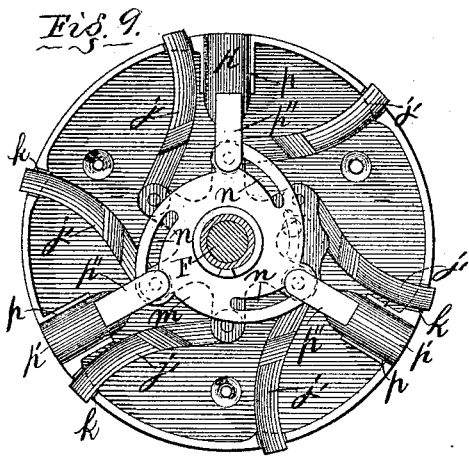
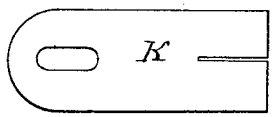
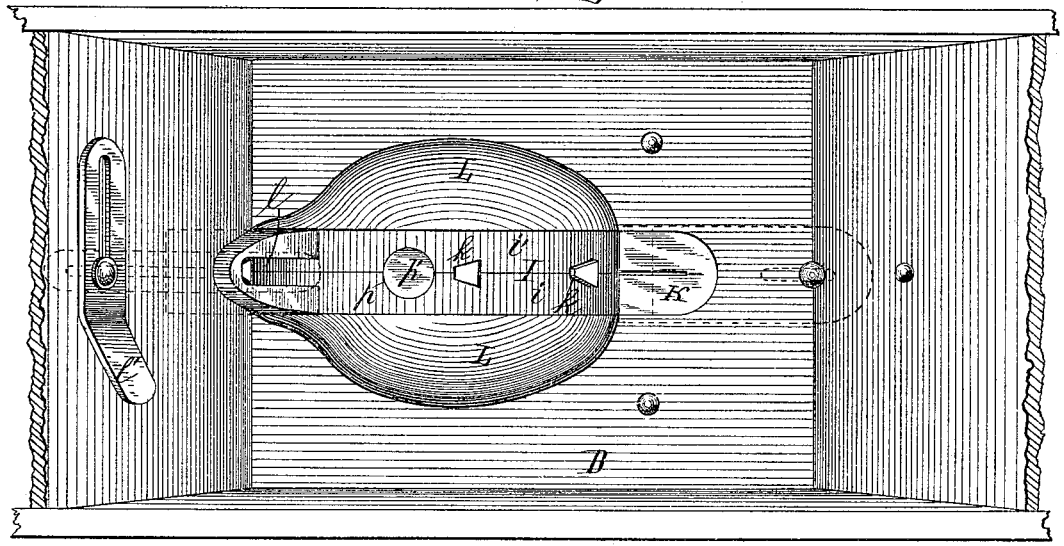

UNITED STATES PATENT OFFICE.

JAMES W. ATKINSON AND CHARLES E. WHITE, OF MOLINE, ILLINOIS, ASSIGNORS TO DEERE & MANSUR COMPANY, OF SAME PLACE.

COMBINED CORN AND COTTON PLANTER.

SPECIFICATION forming part of Letters Patent No. 350,964, dated October 19, 1886.

Application filed January 26, 1886. Serial No. 189,842. (No model.)

*To all whom it may concern:*

Be it known that we, JAMES W. ATKINSON and CHARLES E. WHITE, citizens of the United States, residing at Moline, in the county of Rock Island and State of Illinois, have invented certain new and useful Improvements in a Combined Corn and Cotton Planter, of which the following is a specification.

The object of our invention is to produce a machine in which the same working parts, including the same dropping-cylinder, may be used to plant either corn or cotton seed; and to the end of effecting this object the main feature of our invention consists in a dropping-cylinder provided with suitable devices for measuring the charges of corn and separating them from the corn in the seed-box, and with suitable devices for measuring and separating the charges of cotton-seed from the cotton-seed in the seed-box, both the corn and cotton-seed measuring devices being contained in the same cylinder, and so constructed and organized that either may be adjusted in an operative position while the other is in an inoperative position.

The invention further consists in constructions and combinations hereinafter described and claimed.

In the accompanying drawings, which illustrate our invention, Figure 1 is a side elevation of the planter. Fig. 2 is a top plan of the right-hand side of the planter, the driving-bolt removed. Fig. 3 is a perspective of the dropping-cylinder. Fig. 4 is a vertical central sectional elevation of the left-hand side of the seed-box, dropping-cylinder, seed-tube, and other adjacent parts. Fig. 5 is same sectional elevation as Fig. 4, but shows the right-hand side of the parts recited in Fig. 4. Fig. 6 is an enlarged section through one of the seed-cups and its adjustable bottom. Fig. 7 is a side-elevation of the parts shown at Fig. 3, partly broken away. Fig. 8 is an enlarged elevation of that side of the dropping-cylinder which is the reverse of the side shown at Figs. 3 and 7. Fig. 9 is an enlarged elevation of the dropping-cylinder with one side wall removed. Fig. 10 is a plan of the cut-off used with the cotton-dropper. Fig. 11 is a top plan of the seed-box with the parts adjusted for planting cotton-seed.

Referring to the drawings by letters—the same letter indicating the same part in the different figures—letters A represent two frame-bars on which is fixed a seed-box, B. The bars A converge at their forward ends, and are there provided with a draft-bar, $a$, and an adjustable trash clearer, $a'$. The clearer $a'$ may be dispensed with, if desired. The draft-bar $a$ has a series of holes, $a''$, to either of which the draft may be attached to regulate the depth of planting. Between the clearer $a'$ and seed-box B is the drive-wheel C, journaled in suitable bearings in the bars A.

D is the seed-tube with a furrow-opener at its lower end.

E E are ordinary covering-shovels, E' a rear supporting-wheel, and $e$ $e$ handles by which the planter is manipulated in turning and otherwise.

The parts hereinbefore described by reference-letters are, as constructed and combined, well-known in planters, and need not be any more fully herein described.

F is a shaft located transversely of the bars A, and journaled in suitable bearings on said bars and beneath the seed-box. One end of the shaft F projects (see Fig. 2) and carries a sprocket-wheel, $f$.

G is a shaft, which extends through the seed-box and has a sprocket, $g$, on its outer end. The shaft of the wheel C has a sprocket, $c$, on its outer end. A chain belt, G', gears the sprockets $f$ $g$ $c$ with each other, by means of which the wheel C gives motion to the shafts F and G in the same direction, as indicated by the arrows at Figs. 4 and 5.

G'' is an idler-pulley for tightening the belt G'.

H is a clutch operated by a lever, $h$, and can be thrown in or out of gear with a similar clutch on the hub of the sprocket $f$, for the purpose of throwing the shaft F into or out of gear with the wheel C.

I is the dropping-cylinder, formed of two half cylinders, $i$ $i'$, secured together by bolts $i''$. The shaft F passes centrally through the dropping-cylinder, and the cylinder and shaft are secured together by a set-screw bolt, $f'$, which passes through the hub or boss $i'''$ of the half-cylinder $i$ (see Fig. 8) to the shaft F. Within the half-cylinder $i$ a plate, J, is fitted loosely on the shaft F, and to each of its radial arms $j$, a curved tooth $j'$, is hinged at one end, while its other end rests in an opening, $k$, formed in the adjacent sides of the half-cylinders $i\ i'$. It will readily be seen that the plate J may be turned to thrust the teeth $j'$ outward beyond the periphery of the cylinder I, and also turned in a reverse direction to retract said teeth. The plate J is operated, as last described, by a pin, $k'$, which projects through a segment-slot in the end of the half-cylinder $i$, and has a nut on its outer end, by which it may be held after adjustment. (See Fig. 8.)

The shaft G has arms $g$ projecting radially therefrom within the seed-box, which act as stirrers in planting cotton-seed, and not only stir and loosen up the seed, but also tend to force it toward the projecting teeth $j'$, which teeth, projecting slightly, catch small quantities of the seed and force it downwardly through the projecting end of the split cut-off K, (see Figs. 5 and 10,) which is made of yielding material to permit of the same. The quantity of seed dropped in each charge may be regulated by regulating the extent of projection of the teeth $j'$.

The cylinder I is covered by a hood, L, with an openining, $l$, in its upper side, and $l'$ is a hinged cover, which may be turned up, as shown by full lines at Figs. 5 and 11, to allow the teeth $j'$ to pass upward when planting cotton-seed.

The half-cylinder $i'$ has within it a plate, $m$, loosely mounted on the shaft F, and from its side next the end of the cylinder a lug, $m'$, projects outwardly through a segmental slot, $m''$, in said end of the cylinder, and is received in a recess, $m'''$, in a collar, $m^4$, which collar can be turned on the shaft F, or adjusted radially on said shaft, and held after adjustment by a set-screw, $m^5$. By thus adjusting the collar $m^4$ the plate $m$ may be adjusted or turned on the shaft F, and held in different radial positions with reference thereto. The plate $m$ has segmental slots $n$, each arranged obliquely to a radial line from the center of the plate. Seed-cups $p$ are formed by coincident semi-cylindrical recesses in each half-cylinder $i\ i'$, and each seed-cup $p$ has an adjustable bottom formed of a piston $p'$, which fits snugly in the seed-cup, and has an arm, $p''$, extending toward the shaft F, which arm is provided with a stud-pin, $n'$, which extends into one of the slots $n$. It will be seen that by turning the collar $m^4$ the plate $m$ may be turned to force the pistons or seed-cup bottoms $p'$ outwardly or inwardly in the seed-cups, and when so adjusted to any point desired they are held by the set-screw $m^5$, and thus the quantity of seed to be dropped in each charge may be regulated. The bottoms $p'$ may further be adjusted to entirely close the seed-cups, for purposes hereinafter described. They may, if preferred, be adjusted by the same means we have described for adjusting the teeth $j'$. The number of seed-cups may also be varied as desired.

In planting corn the teeth $j'$ are retracted by the means hereinbefore described, so that their outer ends are in line with the periphery of the cylinder I, and thus close the holes in the cylinder through which they project, and the seed-cup bottoms $p'$ are adjusted, as hereinbefore described, to furnish the desired quantity of seed in each charge. The plate or cover $l'$ is then turned down to the position shown by full lines at Fig. 4 and by dotted lines at Fig. 11, to prevent corn dropping into the rear end of the opening $l$ in the hood L. The cut-off K is then removed and a spring cut-off, Q, put in place in its stead. (See Fig. 4.) The cut-off Q has a plate, Q', extending downward close to the cylinder I, which plate Q' will retain the corn-seed in the seed-cups until they have reached so low a position that the whole of the contained seed will be dropped at once, and not dribbled.

While the teeth $j'$ are projected and the planter in use in planting cotton-seed the bottoms $p'$ of the seed-cups for dropping corn are projected so that they are flush with the periphery of the cylinder I, and thus entirely close the seed-cups.

By means of the cotton-seed-dropping devices and corn-dropping devices herein described we are enabled to furnish a planter adapted to drop both kinds of these seed from the same cylinder without any change of any part of the frame, furrow-openers, coverers, or other part, except the adjustment of parts which is hereinbefore described, and which is readily, quickly, and easily effected.

We are aware that a cotton-planter with teeth adjustable similarly to ours is old, and hence we do not claim this feature, *per se;* but

What we claim as new, and desire to secure by Letters Patent, is—

1. In a seed-planter, in combination, a dropping-cylinder having a series of seed-cups in its periphery, sliding seed-cup bottoms, and an adjustable plate having segment-slots with which the sliding seed-cup bottoms are connected, and whereby they receive a positive motion in both directions toward and from the center of the dropping-cylinder, to adjust the depth of the seed-cups or entirely close them, substantially as and for the purpose specified.

2. In a seed-planter, a cylinder, I, having seed-cups $p$, sliding bottoms $p'$, having stud-pins, and adjustable plates $m$, having segment-slots $n$, in which said stud-pins are seated, substantially as and for the purpose specified.

3. In a seed-planter, a cylinder, I, having seed-cups $p$, sliding bottoms $p'$, having stud-pins, plate $m$, having lug $m'$, and segment-slots $n$, in which said stud-pins are seated, collar $m^4$, having recess $m'''$, and shaft F, substantially as and for the purpose specified.

4. In a combined corn-planter and cotton-planter, in combination with a dropping-cylinder, a series of adjustable teeth or fingers that can be extended simultaneously beyond the periphery of said cylinder for dropping cotton-seed, and can be simultaneously retracted within the cylinder to render them inoperative, and a series of seed-cups in said cylinder having sliding bottoms, which can be simultaneously moved to adjust the capacities of the seed-cups and to entirely close them, substantially as and for the purpose specified.

5. In combination, in a seed-dropping cylinder, the teeth $j'$, adjustable by means of a plate, to which they are hinged, and the seed-cups with bottoms adjustable by means of a plate with segmental slots, substantially as and for the purpose specified.

6. In a combined cotton-seed planter and corn-planter, a dropping-cylinder provided with cotton-seed-dropping teeth and corn-dropping seed-cups with adjustable bottoms, and means whereby the cotton-seed-dropping teeth may be made inoperative while the cylinder is dropping corn, and the corn-dropping seed-cups closed while the cylinder is dropping cotton-seed, substantially as specified.

7. In combination with the drive-wheel, furrow-openers, covering-shovels, chain belt, and sprocket-wheels $f$, $g$, and $c$, the cylinder I, provided with corn-dropping and cotton-seed-dropping devices, and the stirrers G $g$, substantially as and for the purpose specified.

8. In combination with the cylinder I, provided with adjustable teeth $j'$ and adjustable seed-cup bottoms, and hood L, with opening $l$, the adjustable cover $l'$, substantially as and for the purpose specified.

9. In combination, the cylinder I, provided with adjustable teeth $j'$ and adjustable seed-cup bottoms, and the substitutive cut-offs K Q, substantially as and for the purpose specified.

10. In a combined cotton-seed planter and corn-planter, a rotating dropping-cylinder having adjustable teeth $j'$ for dropping cotton-seed, and adapted to close the openings in which they slide while the cylinder is used in dropping corn, and having seed-cups with adjustable bottoms adapted, further, to close the corn-seed cups while the cylinder is in use in dropping cotton-seed, substantially as and for the purpose specified.

11. In a combined cotton-seed planter and corn-planter, in combination, a cylinder, I, having seed-cups $p$, with bottoms $p'$, adjustable by means of a plate, $m$, having segment-slots $n$, and teeth $j'$, adjustable by means of a plate, J, to which they are hinged, substantially as and for the purpose specified.

In testimony whereof we affix our signatures in presence of two witnesses.

JAMES W. ATKINSON.
CHARLES E. WHITE.

Witnesses:
JOHN W. GOOD,
OSCAR F. LUNDAHL.